United States Patent [19]

Sumrall et al.

[11] Patent Number: 5,046,446
[45] Date of Patent: Sep. 10, 1991

[54] REMINDER DEVICE

[76] Inventor: Curtis E. Sumrall, 5814 Woodchase Drive; William J. Wilkens, 430 Tomahawk Trail, both of Anniston, Ala. 36206

[21] Appl. No.: 570,511

[22] Filed: Aug. 21, 1990

[51] Int. Cl.$^5$ .................... A45B 25/30; B60Q 11/00
[52] U.S. Cl. ......................... 116/200; 116/28 R; 116/306; 135/16
[58] Field of Search ....................... 116/200, 201; 224/DIG. 915

[56] References Cited

U.S. PATENT DOCUMENTS

| Re. 28,289 | 12/1974 | Calkins | 224/901 X |
|---|---|---|---|
| 3,895,797 | 7/1975 | Moore | 224/901 X |
| 4,236,479 | 12/1980 | Walker et al. | 116/200 X |
| 4,887,543 | 12/1989 | Rockhill | 116/201 |

Primary Examiner—Daniel M. Yasich
Attorney, Agent, or Firm—Fleit, Jacobson, Cohn, Price, Holman & Stern

[57] ABSTRACT

A reminder device attached to an umbrella that can be removed from the umbrella and stored in a conspicuous position when the umbrella is removed by a person using the umbrella or carrying the umbrella for later use. The reminder device reminds the umbrella user that the umbrella should be returned to its normally stored position when the user returns to the area in which the umbrella is normally stored to enable the umbrella user to retrieve the umbrella in the event it has been forgotten and not returned to its normally stored position. The reminder device is a panel having magnetic properties to enable it to be attached to the exterior of a vehicle door adjacent the door handle and lock assembly with the panel being detachably connected to the normally provided retaining strap on an umbrella so that the panel can be separated from the umbrella and mounted on the vehicle door when a person leaves an automobile and carries the umbrella to a destination. When the user of the umbrella returns to the vehicle, the reminder device will remind the person that the umbrella was taken out of the automobile thereby enabling the person to retrieve the umbrella in the event it has been forgotten. When the umbrella is returned to the automobile, the reminder device is reapplied to the strap of the umbrella.

5 Claims, 1 Drawing Sheet

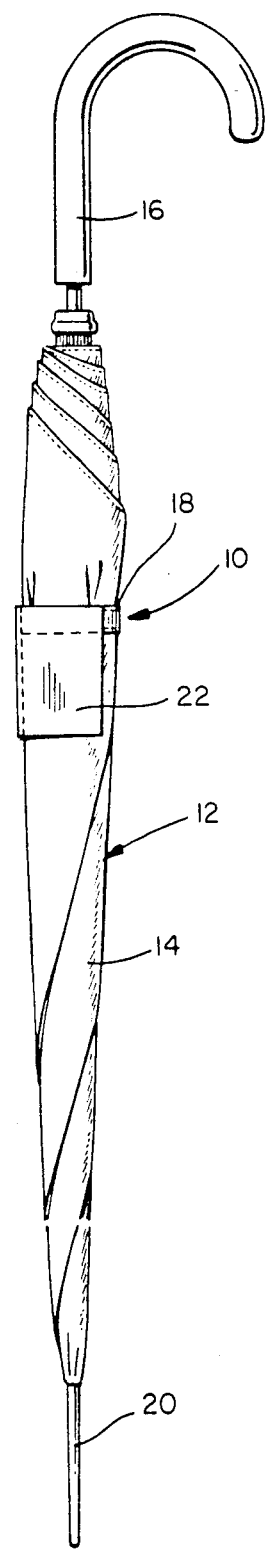
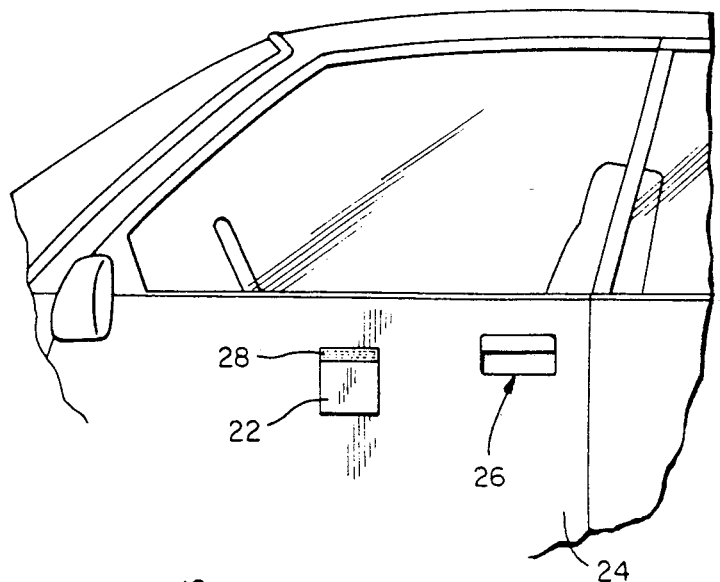
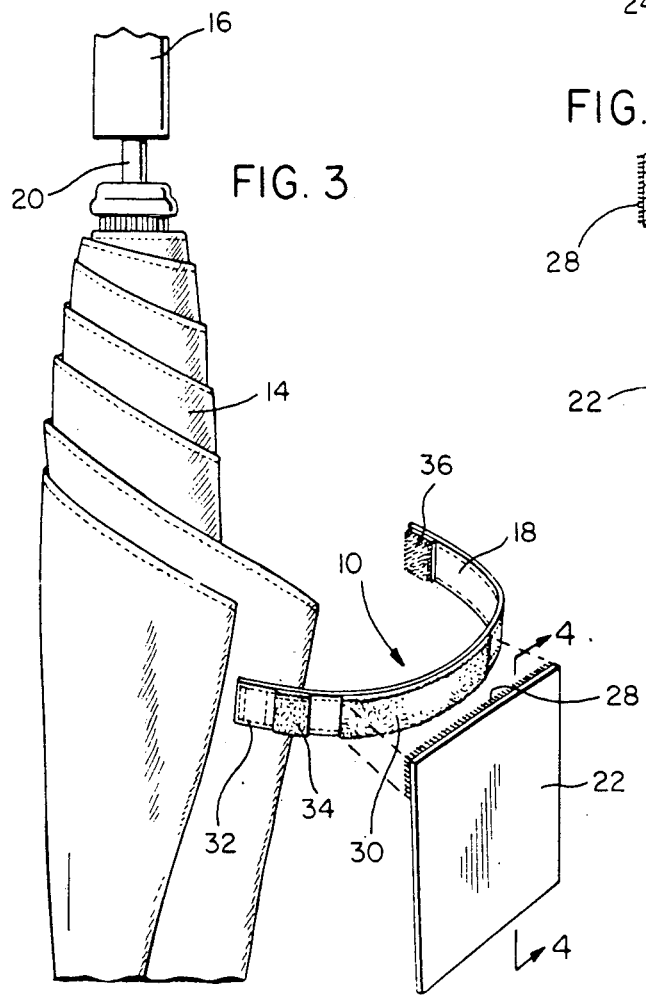
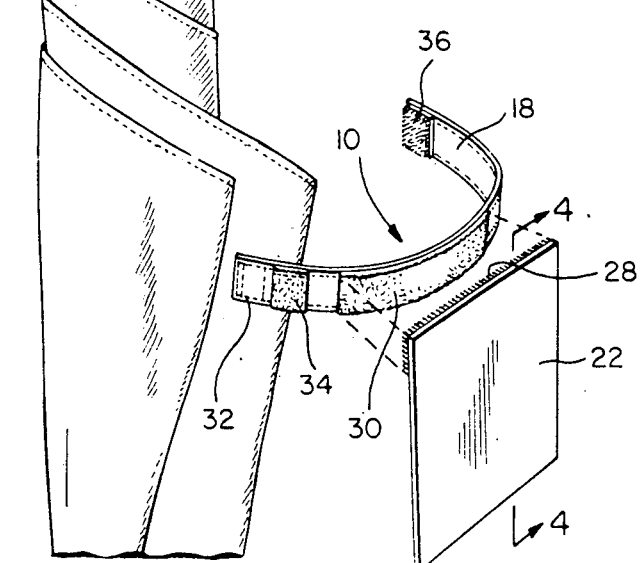

REMINDER DEVICE

BACKGROUND OF THE INVENTION

1. Field of the Invention

The present invention generally relates to a device to remind a person that a particular article or item has been forgotten or to remind a person to retrieve an article or item or perform some other activity. Specifically, the invention is a reminder device attached to an umbrella that can be removed from the umbrella and stored in a conspicuous position when the umbrella is removed by a person using the umbrella or carrying the umbrella for later use. The reminder device reminds the umbrella user that the umbrella should be returned to its normally stored position when the user returns to the area in which the umbrella is normally stored to enable the umbrella user to retrieve the umbrella in the event it has been forgotten and not returned to its normally stored position. The reminder device is a panel having magnetic properties to enable it to be attached to the exterior of a vehicle door adjacent the door handle and lock assembly with the panel being detachably connected to the normally provided retaining strap on an umbrella so that the panel can be separated from the umbrella and mounted on the vehicle door when a person leaves an automobile and carries the umbrella to a destination. When the user of the umbrella returns to the vehicle, the reminder device will remind the person that the umbrella was taken out of the automobile thereby enabling the person to retrieve the umbrella in the event it has been forgotten. When the umbrella is returned to the automobile, the reminder device is reapplied to the strap of the umbrella.

2. Description of the Prior Art

Various efforts have been made to remind people to retrieve articles or perform certain functions such as the well known practice of tying a string around one's finger to remind them to undertake certain activities. Various more sophisticated devices have been provided to remind people to fasten their seat belts in an automobile, remove the ignition key from the automobile, release the brakes on an automobile and the like. The following U.S. patents relate to this field of endeavor.

U.S. Pat. No. 3,800,730
U.S. Pat. No. 4,106,428
U.S. Pat. No. 4,236,479
U.S. Pat. No. 4,770,114
U.S. Pat. No. 4,887,543

U.S. Pat. No. 4,236,479 discloses a device for reminding an automobile operator to turn off the head lights before exiting the automobile. U.S. Pat. No. 4,887,543 discloses a device associated with an umbrella that is attached to the key ring of the umbrella user so that when the key ring is used, the umbrella user is reminded to retrieve the umbrella. However, the prior art does not disclose the specific structure and operating mode of the present invention.

SUMMARY OF THE INVENTION

An object of the present invention is to provide a reminder device that is attached to the existing retaining strap which encircles an umbrella when in its collapsed position and includes a panel having magnetic characteristics which enable the panel to be separated from the umbrella retaining strap and placed on the exterior surface of a vehicle door adjacent the door handle and lock assembly when leaving the automobile with the umbrella with the panel being readily observable when the umbrella user returns to the automobile with the umbrella user being reminded to retrieve the umbrella if it has been forgotten since the umbrella user will observe the panel when actuating the vehicle door lock or door handle.

Another object of the invention is to provide a reminder device in accordance with the preceding object in which the panel is in the form of a flexible, plastic magnetic member of a distinguishable color and of a size to be readily observable.

A further object of the invention is to provide a reminder device in accordance with the preceding objects in which the umbrella retaining strap and an edge portion of the flexible panel include hook and loop pile fabric fastener material available under the trademark "VELCRO".

Still another object of the invention is to provide a reminder device in accordance with the preceding objects which is simple in construction, can be incorporated into existing umbrellas or newly constructed umbrellas with little additional costs and provides an effective reminder to umbrella users to retrieve their umbrellas in the event the umbrella is forgotten and also is capable of use in reminding individuals to perform certain activities in which the reminder device is conspicuously placed in order for it to be observed by an individual to effectively remind that individual to perform a particular function.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of an umbrella with the reminder device of the present invention incorporated therein.

FIG. 2 is a fragmental elevational view illustrating a panel forming part of the reminder device of the present invention magnetically attached to the exterior surface of a vehicle door adjacent the door handle and lock assembly.

FIG. 3 is an exploded perspective view illustrating the relationship between the umbrella, retaining strap and panel.

FIG. 4 is a vertical sectional view taken along section line 4—4 on FIG. 3 illustrating the structure of the panel which forms a portion of the reminder device.

DESCRIPTION OF THE PREFERRED EMBODIMENT

Referring now specifically to the drawings, the reminder device of the present invention is generally designated by reference numeral 10 and is associated with a conventional umbrella 12 having the usual canopy 14 and handle structure 16 with the canopy 14 being foldable into a collapsed position as illustrated in FIGS. 1 and 3 with the reminder device 10 being associated with a retaining strap 18 normally provided on the umbrella for retaining the folds of the umbrella canopy in a spirally wrapped condition around the elongated stem 20 of the umbrella 12 which represents conventional umbrella structure. While the reminder device 10 has been illustrated in association with an umbrella having a rigid elongated stem 20, it can be used with various types of automatically opening umbrellas, foldable umbrellas and the like since these umbrellas also include a retaining strap which has one end attached to the umbrella and the other end being detachably connected to the end of the strap that is connected to the umbrella.

The reminder device 10 includes a generally rectangular, flexible panel 22 which may be of any distinguishable color but preferably a color which can readily observed. The panel 22 is constructed of a flexible plastic material having magnetic characteristics incorporated therein which is a commercially available product and which enables the panel 22 to be magnetically attached to the exterior surface of a vehicle door 24 constructed of sheet metal as illustrated in FIG. 2 in which the panel 22 is positioned relatively close to the door handle and lock assembly 26 on the vehicle door 24 in order for a person approaching the vehicle and operating the door handle and lock assembly 26 to have their attention drawn to the panel 22 due to its proximity and distinguishable color.

An edge portion of the panel 22 is provided with a strip of fastening material 28 and the strap 18 has a strip of fastening material 30 attached to the outer surface thereof with the strips of fastening material 28 and 30 being hook and loop pile fastening material available under the trademark "VELCRO". This enables the panel 22 to be detachably connected to and supported from the strap 18 with the flexibility of the panel 22 and the fastener strips 28 and 30 enabling the panel 22 to curve with the exterior surface of the collapsed umbrella 12 as illustrated in FIG. 1. The retaining strap has one end thereof attached to the umbrella canopy 20 by stitching or other fastening means as indicated by reference numeral 32 and includes a pad of fabric fastener material 34 adjacent the attachment point 32. The free end of the strap 18 is provided with a pad of fabric fastening material 36 which will cooperate with the fastening material 34 when the strap 18 is wrapped around the folded umbrella to retain the retaining strap 18 in encircling relation to the folded umbrella canopy 14. The fabric fastener pads 34 and 36 are also available under the trademark "VELCRO".

The fastener strips 28 and 30 and the fastener pads 34 and 36 may be secured to the panel 22 and strap 18 by adhesive backing on the fastener strips and pads or by stitching or by any other fastening arrangements. Thus, by constructing the retaining strap 18 of a strip of "Velcro" material attached at one end to the umbrella canopy by stitching and retained in encircling relation by an inwardly facing end pad of "VELCRO", the cost of the retaining strap will only be slightly greater than a conventional retaining strap for an umbrella. The retaining strap may be the same color as the umbrella canopy or it may be distinguishably colored as compared to the canopy for easier observation and location when using the umbrella in a normal manner. The panel 22 is constructed from a commercially available flexible plastic panel having magnetic characteristics which will securely but yet detachably mount the panel 22 on the vehicle door and the fastening strip 28 is also flexible with the hooks thereon detachably engaging the loop pile 30 to securely but detachably mount the panel 22 on the umbrella 12.

When the umbrella is carried in an automobile and weather conditions indicate that it would be prudent to carry the umbrella when leaving the automobile, the separation of the panel 22 from the retaining strap 18 is quickly and easily accomplished with the panel 22 being positioned on the exterior of the door adjacent the door handle. With the retaining strap 18 being of a distinguishable color, it can be readily located if it is placed adjacent other umbrellas or may prevent it from being mistakenly taken by another person when the person carrying the umbrella enters a restaurant, office or the like and places it adjacent other umbrellas which may be similar in appearance except for the colored strap 18. When the person returns to the automobile, the panel 22 will be observed as the person approaches the vehicle door handle. If the person approaching the door handle does not have the umbrella, that person is reminded to retrieve the umbrella from wherever it was left. This condition frequently occurs when a person leaves an automobile with an umbrella when inclement weather appears imminent. However, when the person returns to the automobile, weather conditions may have improved and other situations may have occurred which cause the person to forget the umbrella and leave it in a restaurant, office or the like. When the person approaches the vehicle door handle and sees the reminder panel 22, the person will be reminded to retrieve the umbrella or remove the panel 22 and place it back on the folded umbrella by attachment to the strap 18. By receiving an immediate reminder while memory is still vivid, the steps of the person forgetting the umbrella may be easily retraced thereby enhancing the possibility of retrieval of the umbrella. While the invention has been disclosed in connection with umbrellas, it can be used with other articles which have a tendency of being forgotten especially items which are taken out of an automobile and carried into various establishments such as restaurants, shopping malls and the like and sometimes forgotten when returning to the automobile. Also, the reminder device may be used with various articles, items and situations including reminding individuals to perform various activities or undertake various projects.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A device for reminding an individual to retrieve a forgotten umbrella which has been taken from a vehicle and forgotten when the person using the umbrella returned to the vehicle, said reminder device comprising a panel having a distinguishable color, first means on the panel detachably mounting the panel on an umbrella and second means on the panel detachably mounting the panel on the exterior of a vehicle door adjacent the door handle in position for observation by a person approaching the vehicle door handle thereby reminding the person to retrieve the umbrella if it has been forgotten and to replace the panel on the umbrella if the umbrella is in the possession of the person approaching the vehicle door.

2. The structure as defined in claim 1 wherein said means detachably mounting the panel to the umbrella includes hook and pile loop fastening strips mounted on the panel and on an umbrella retaining strap.

3. The structure as defined in claim 2 wherein said means detachably mounting the panel on the vehicle door includes the panel being constructed of a flexible plastic material having magnetic characteristics for detachably securing the panel in surface-to-surface engagement with the exterior surface of the vehicle door.

4. The structure as defined in claim 1 wherein said panel is of rectangular, flexible material to conform with the curvature of the surface of the door and to conform with the curvature of a folded umbrella and a retaining strap to which the panel is attached.

5. The structure as defined in claim 4 wherein said panel is of plastic material having magnets embedded therein.

* * * * *